United States Patent [19]

Brown

[11] 4,058,276
[45] Nov. 15, 1977

[54] PILOT CHUTE CROWN LINE ATTACHMENT SYSTEM

[75] Inventor: Herbert R. Brown, Monroe County, N.Y.

[73] Assignee: The United States of America as represented by the Secretary of the Air Force, Washington, D.C.

[21] Appl. No.: 769,374

[22] Filed: Feb. 16, 1977

[51] Int. Cl.$^2$ ............................................. B64D 17/68
[52] U.S. Cl. ................................................. 244/152
[58] Field of Search ................ 244/142, 145, 149, 152

[56] References Cited

U.S. PATENT DOCUMENTS

| | | | |
|---|---|---|---|
| 2,164,122 | 6/1939 | Pool | 244/152 |
| 2,358,417 | 9/1944 | Quilter et al. | 244/142 |
| 3,161,896 | 12/1964 | Holt et al. | 244/142 |
| 3,228,636 | 1/1966 | Lemoigne | 244/152 |

FOREIGN PATENT DOCUMENTS

| | | | |
|---|---|---|---|
| 1,043,825 | 11/1958 | Germany | 244/142 |
| 354,691 | 12/1937 | Italy | 244/142 |
| 207,040 | 2/1968 | U.S.S.R. | 244/142 |

Primary Examiner—Galen L. Barefoot
Attorney, Agent, or Firm—Joseph E. Rusz; Richard J. Killoren

[57] ABSTRACT

A system for attaching the pilot chute to the crown area of a main parachute having a parachute vent pull down apparatus including a thong-disc assembly and a crown line assembly secured to the pilot chute bridle. The pilot chute bridle is connected between the pilot chute and a position on the main parachute canopy adjacent the crown area. The pilot chute bridle and six crown lines are equally spaced around the crown area of the canopy. Each of the six crown lines includes a loop at their free ends. The thong-disc assembly includes six fabric thongs equally spaced together with the bridle around a circular disc. The crown line assembly includes seven panels with the pilot chute bridle line being secured along the junction of two panels and webbing member secured along other junction lines between panels. Pilot chute bridle attachment loops are connected to the webbing members and pass through a loop on the bridle. Thong-disc attachment loops are also secured to the webbing members and pass through the loops on the crown lines and then engage the thongs on the thong-disc assembly.

3 Claims, 7 Drawing Figures

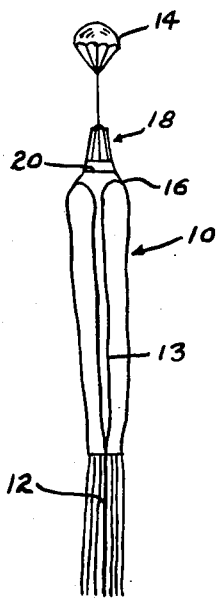
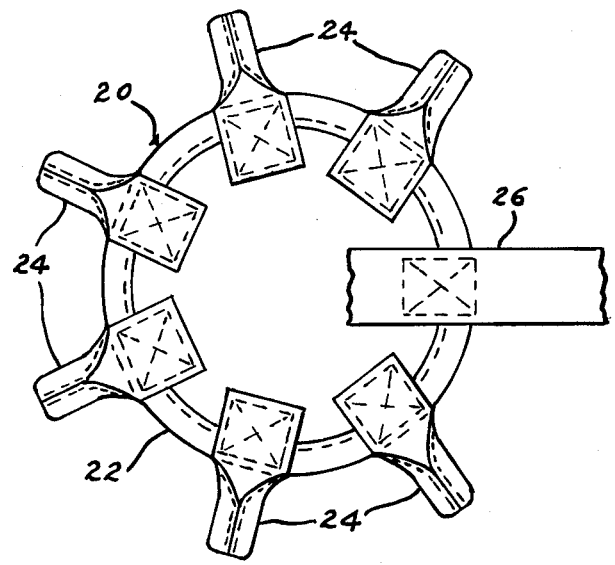
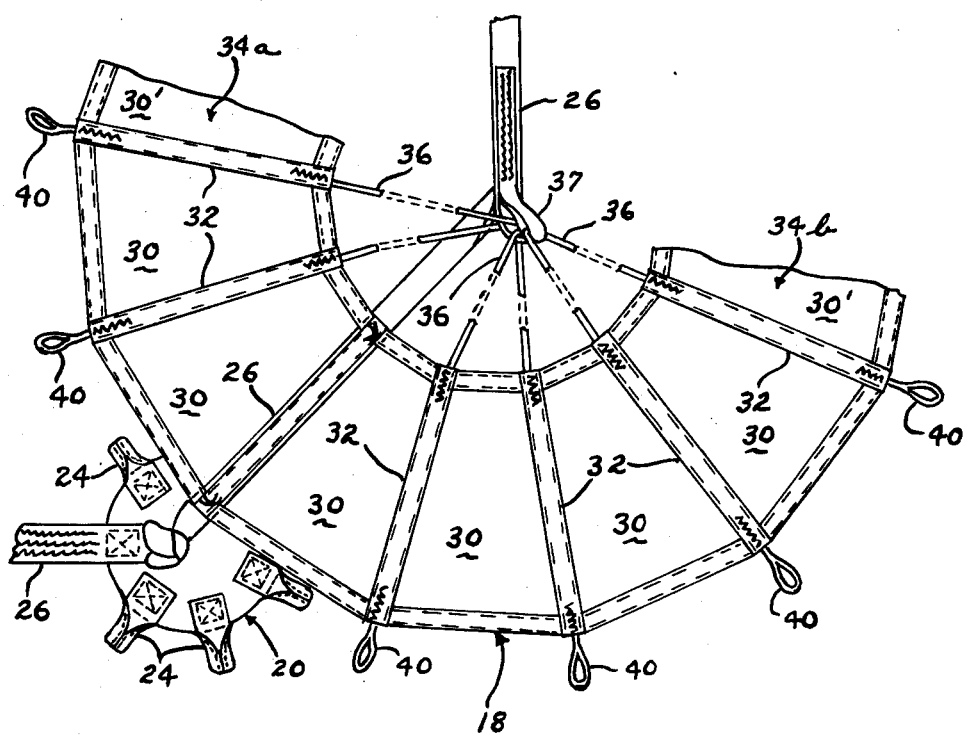

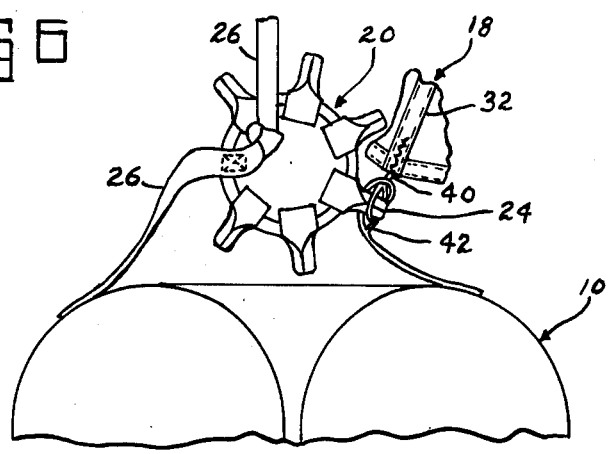
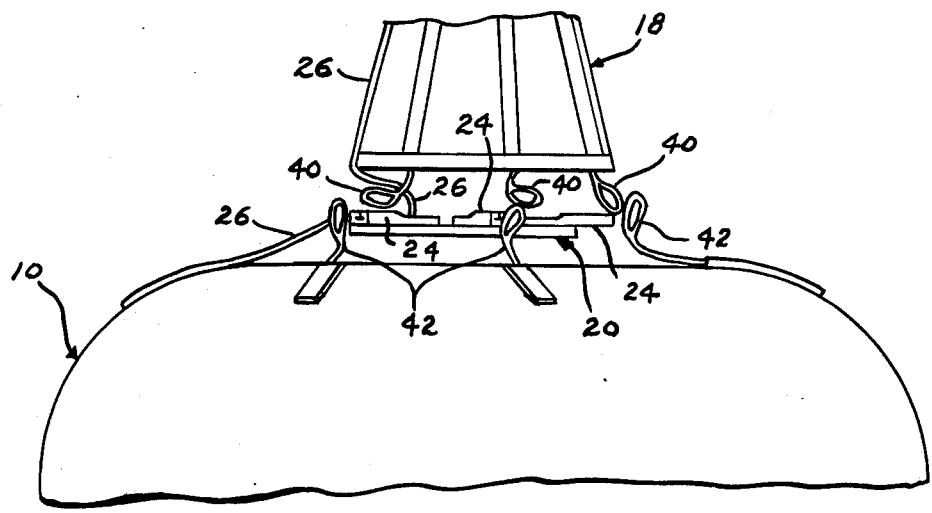

PILOT CHUTE CROWN LINE ATTACHMENT SYSTEM

RIGHTS OF THE GOVERNMENT

The invention described herein may be manufactured and used by or for the Government of the United States for all governmental purposes without the payment of any royalty.

BACKGROUND OF THE INVENTION

In parachute systems incorporating canopy inflation aids, such as the pull-down vent line, the pilot chute has been attached to the canopy crown area with long lines or with unsymmetrical canopy attachment methods. The long crown lines are susceptible to entanglement and unsymmetrical attachments may cause canopy damage and poor performance.

BRIEF SUMMARY OF THE INVENTION

According to this invention, the pilot chute is attached to the crown area of the main parachute canopy by means of a thong-disc assembly and a crown line assembly.

The thong-disc assembly consists of a fabric disc with six fabric thongs and a pilot chute bridle that are secured at equally spaced attachment positions on the fabric disc. The pilot chute bridle and six crown line loops are secured to the main parachute crown at equally spaced positions. A crown line assembly is secured to the pilot chute bridle and has a plurality of bridle attachment loops secured to a bridle loop on the pilot chute bridle. Six thong attachment loops are secured together with the bridle attachment at equally spaced positions on the crown line assembly.

IN THE DRAWINGS

FIG. 1 is a schematic diagram showing a parachute with a parachute vent pull down line and including the pilot chute attachment system of the invention.

FIG. 2 is a plan view of a thong-disc assembly used in the device of FIG. 1.

FIG. 3 is a partially schematic view showing the thong-disc assembly and crown line assembly of FIG. 1 attached to the pilot chute bridle.

FIG. 6 is a schematic illustration showing the thong attachment system for the attachment assembly of FIG. 1.

FIG. 7 shows the attachment system of FIG. 4 after partial inflation of the parachute canopy.

DETAILED DESCRIPTION OF THE INVENTION

Figure 4:
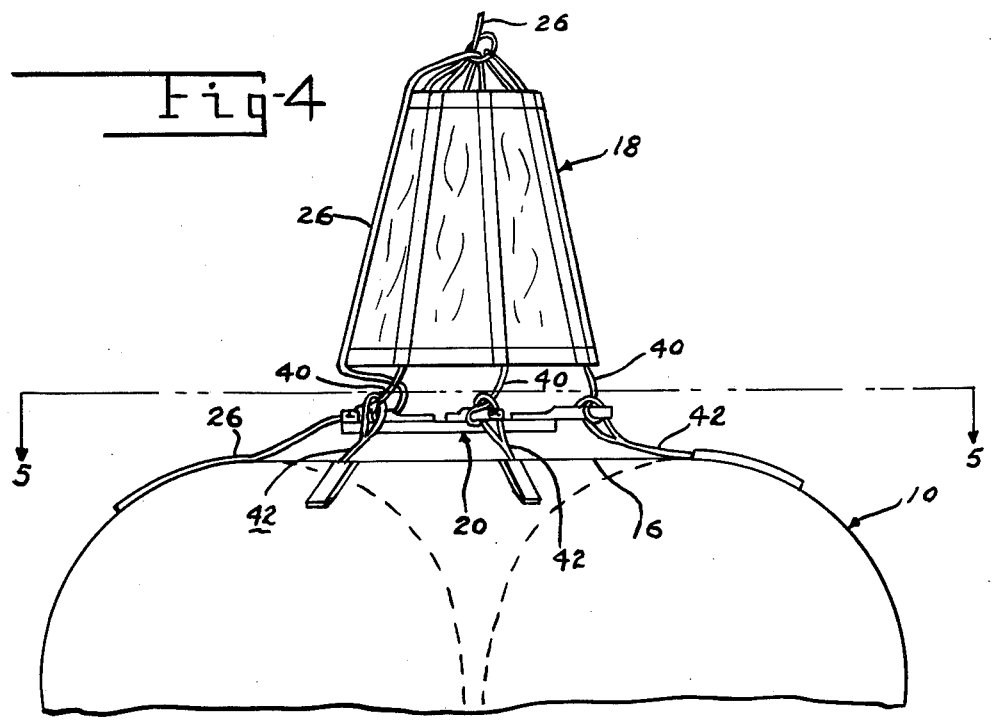
FIG. 4 is an enlarged partially cut away schematic view of the pilot chute attachment system of FIG. 1.

Reference is now made to FIG. 1 of the drawing which shows a main parachute canopy 10 with a pull-down vent line 12 which pulls down the vent portion 13 of the main parachute in a conventional manner. A pilot chute 14 is secured to the crown area 16 of the main parachute canopy by means of a crown line assembly 18 and a thong-disc assembly 20.

The thong-disc assembly includes a circular fabric disc member 22, of a material such as Nylon, with six fabric thongs 24, of a material such as 1 inch Nylon tape, with ends folded over, secured at spaced positions around the disc. The pilot chute bridle 26, of a material such as 2300 lb tubular Nylon, is sewn to the disc member 22 at a position between two thongs 24 with the thongs and bridle providing equally spaced attachments to the thong disc 22.

The crown line assembly 18, shown in greater detail in FIG. 3, has seven trapezoidal panels 30, of a material such as 1.1 oz rip stop Nylon, secured together by webbing member 32, of a material such as ½ Nylon tape. The pilot chute bridle 26 forms one of the webbing members between two panels 30. Panel 30' is shown as separated, to permit a clear showing, but in the device, as used, parts 34a and 34b form a single panel, so that the crown line assembly has substantially a conical shape. Bridle attachment loops 36 of a material such as 550 lb test Nylon cord pass through a bridle loop 37 and are secured to adjacent webbing members 32. A plurality of thong-disc attachment loops 40, of a material such as 550 lb test Nylon cord, are also secured to webbing members 32.

Figure 5:
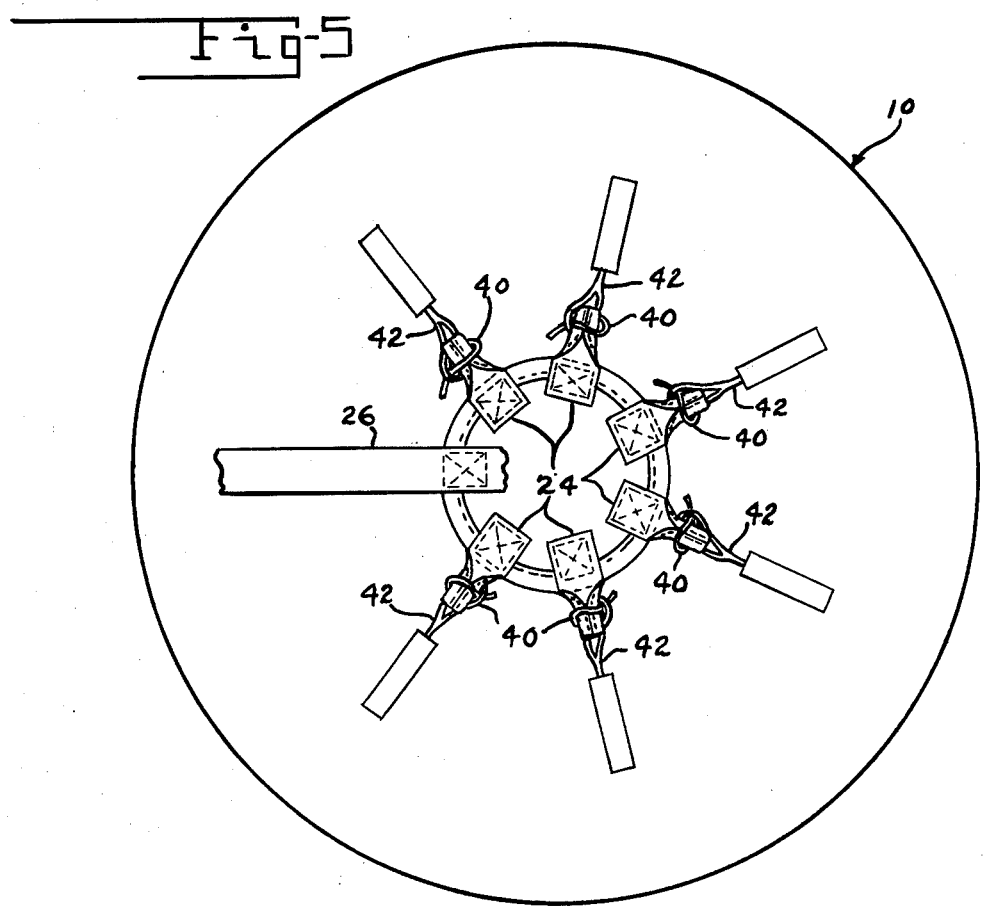
FIG. 5 is a view of the device of FIG. 4 along the line 5—5.

The thong-disc attachment loops 40 pass through crown line loop members 42, of a material such as 550 lb test Nylon, which are secured to the crown area 16 of the canopy 10, and engage the thongs 24 as shown in greater detail in FIGS. 5 and 6. The crown line assembly 18 remains attached to the canopy crown area in this manner during the deployment of the canopy.

In the operation of the device, the pilot chute is secured to the crown area of the main parachute canopy through the crown line assembly 18 and the thong-disc assembly 20 with the thong-disc attachment loops 40 of the crown line assembly 18 passing through the crown line loop members 42 and engaging the thongs 24 on the thong-disc assembly 20. In this manner, the pilot chute deploys the main parachute canopy by applying a continuous and symmetrical force to the canopy crown area. As the canopy inflates, the radial inflating force pulls on the crown line loop members 42 to pull the thong-disc attachment loops 40 from the thongs 24 which releases the crown area of the canopy from the thong-disc assembly 20 and the crown line assembly 18. When the canopy 10 is fully inflated, the deflated pilot chute 14, the crown line assembly 18, and the thong-disc assembly 20 lay along the panel to which the bridle line 26 is attached.

There is thus provided a pilot chute crown line attachment system which eliminates crown line entanglement and poor performance and damage due to unsymmetrical attachment.

I claim:

1. A system for attaching a pilot chute to the crown area of a main parachute having a vent pull-down line, comprising: a pilot chute bridle connected between said pilot chute and one position of the crown area of the main parachute canopy; means connecting said pilot chute bridle to a plurality of additional substantially equally spaced positions of the crown area of said main parachute canopy; said means for securing the pilot chute bridle to the additional positions of the crown area including means, responsive to inflation of the main parachute canopy, for releasing the pilot chute bridle from the additional positions of the crown area of the main parachute canopy.

2. The device recited in claim 1 wherein said means for connecting said bridle to a plurality of additional substantially equally spaced positions of the crown area of the main parachute canopy includes a crown line assembly having a plurality of trapezoidal panels sewn together to form a substantially conically shaped structure; a plurality of bridle loops secured at spaced positions around the smaller end of said conically shaped structure; a bridle loop on said pilot chute bridle engaging the bridle loops on the crown line assembly; means, including said means for releasing the pilot chute bridle from the additional positions of the crown area of the main parachute canopy, for securing equally spaced positions of the larger end of the substantially conically shaped structure to the substantially equally spaced positions of the crown area of the main parachute canopy.

3. The device as recited in claim 2 wherein said means for securing equally spaced positions of the larger end of the substantially conically shaped structure to the substantially equally spaced positions of the crown area of the main parachute canopy includes a thong-disc assembly secured to said pilot chute bridle between the crown line assembly and the main parachute canopy crown area; said thong-disc assembly having a plurality of fabric thongs secured to a fabric thong-disc with the bridle attachment and said thongs being equally spaced around the thong-disc; a plurality of crown line loops secured to the crown area of the main parachute canopy; said crown line loops together with said bridle being secured to the crown area of the canopy at equally spaced positions around the crown area of the canopy; a plurality of thong engaging loops secured at spaced positions around the larger end of said conically shaped structure; said thong engagement loops being adapted to pass through said crown line loops and engage said fabric thongs to thereby secure the pilot chute to said main parachute crown area.

* * * * *